Figure 8:
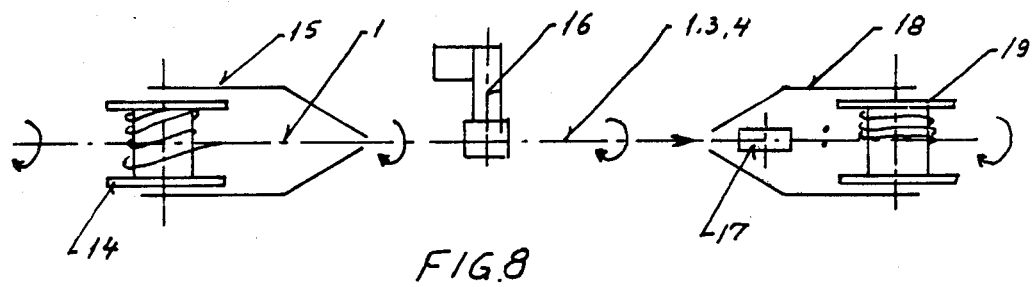

United States Patent [19]

Andersen et al.

[11] 4,178,069
[45] Dec. 11, 1979

[54] PROCESS FOR PREPARING AN OPTICAL ELEMENT FOR INCORPORATION INTO OPTICAL TRANSMISSION MEANS

[75] Inventors: Axel Andersen, Gentofte; Poul U. Knudsen, Hellerup; Knud B. Jensen, Skodsborg, all of Denmark

[73] Assignee: Aktieselskabet Nordiske Kabel-Traadfabriker, Copenhagen, Denmark

[21] Appl. No.: 848,696

[22] Filed: Nov. 4, 1977

[30] Foreign Application Priority Data

Nov. 9, 1976 [DK] Denmark ............... 5050/76

[51] Int. Cl.² .................................................. G02B 5/14
[52] U.S. Cl. ............................ 350/96.23; 350/96.30; 350/320
[58] Field of Search ............... 350/96.23, 96.29, 96.30, 350/96.33, 320

[56] References Cited

U.S. PATENT DOCUMENTS

| | | | |
|---|---|---|---|
| 3,328,143 | 6/1967 | Hicks, Jr. ............................ 65/4 |
| 3,883,218 | 5/1975 | Slaughter ...................... 350/96.23 |
| 3,937,559 | 2/1976 | Ferrentino et al. ............. 350/96.23 |
| 4,028,081 | 6/1977 | Marcatili ...................... 350/96.23 X |
| 4,039,248 | 8/1977 | Franke et al. ................. 350/96.23 |

FOREIGN PATENT DOCUMENTS

| | | | |
|---|---|---|---|
| 2430751 | 1/1976 | Fed. Rep. of Germany . |
| 2513723 | 10/1976 | Fed. Rep. of Germany ........ 350/96.23 |
| 2233637 | 1/1975 | France ................... 350/96.33 |
| 1423590 | 2/1976 | United Kingdom . |
| 1453402 | 10/1976 | United Kingdom . |
| 1487464 | 9/1977 | United Kingdom . |

*Primary Examiner*—John K. Corbin
*Assistant Examiner*—John D. Lee
*Attorney, Agent, or Firm*—Ladas, Parry, Von Gehr et al

[57] ABSTRACT

A process for preparing an optical element comprising an optical fiber located in a tubular jacket in a curve shape with a radius of curvature sufficiently big to avoid a substantial increase of the loss at light transmission in which process by establishing elastic tensions varying over the cross-sectional area of the element, the element is given such a permanent preshape that when placed in the tubular jacket it has a marked tendency to assume by itself the desired curve shape. The fiber itself can be preshaped or it can be provided with an eccentric coating or a segmented multicomponent coating having different contraction tendencies. An optical element so produced and an optical transmission means comprising such an element is also described.

17 Claims, 9 Drawing Figures

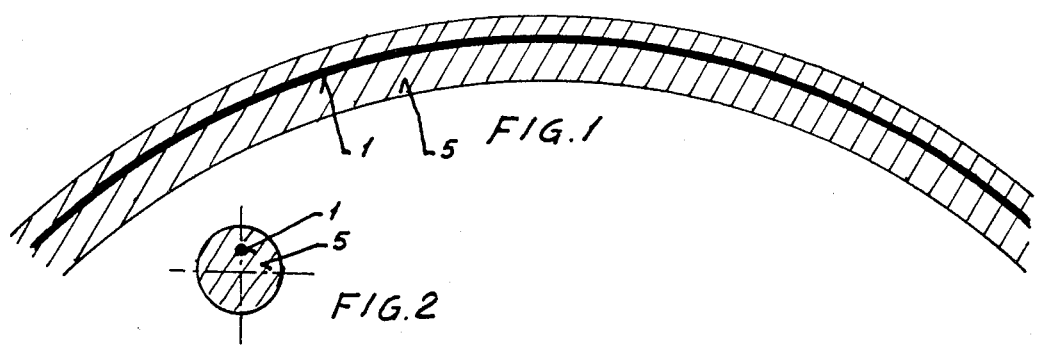
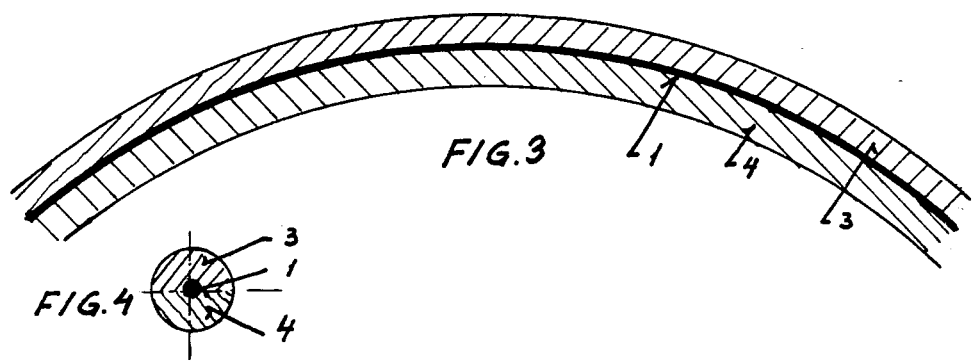
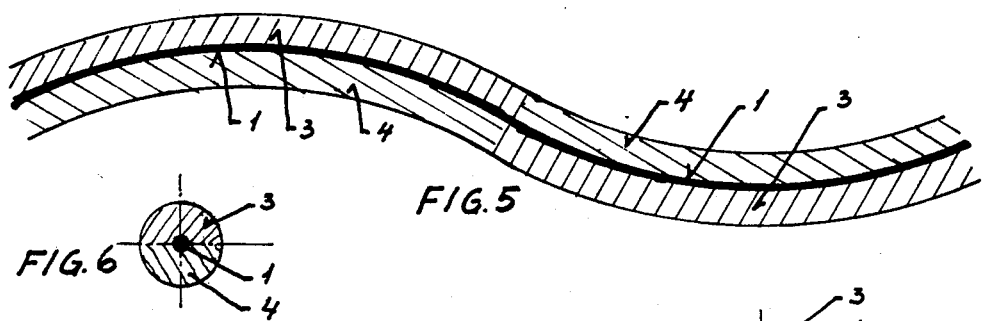
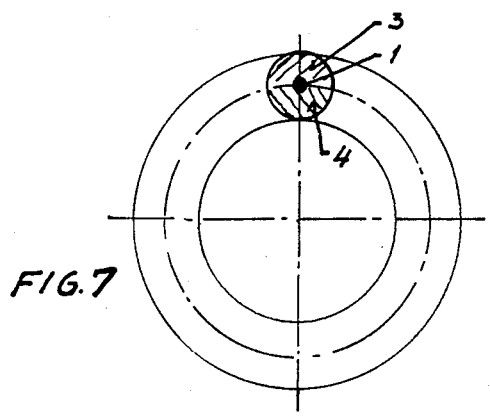

PROCESS FOR PREPARING AN OPTICAL ELEMENT FOR INCORPORATION INTO OPTICAL TRANSMISSION MEANS

BACKGROUND OF THE INVENTION

1. Field of the Invention

The present invention relates to a process for preparing an optical element to be placed in a tubular jacket to form optical transmission means such as a tele-cable, and which comprises an optical fiber of glass or resin, which possibly is provided with a tight fitting coating and which is located in a plane or spatial curve with a radius of curvature being sufficiently big to avoid a substantial increase of the loss at the light transmission. The invention further relates to optical elements so produced and to optical transmission means comprising such optical elements.

2. Description of the Prior Art

It is known to produce tele-cables with optical fibers of glass or a plastic material in which the fibers are placed in the cables in longitudinal spaces with considerably larger cross-sectional dimensions than the fiber diameter, cf. for example the Swedish patent application No. 75,08599-3, (DT-OS No. 25 28 991). It is also known to establish a twisted arrangement of the fibers in such spaces. It is thus especially known from DT-AS No. 24 25 532 to place an optical fiber wave-shaped preferably in one plane in a tubular protective jacket. As far as possible the wave shape is determined by means to ensure a securing of the optical guide which entails a considerable risk in respect of formation of micro-bendings at the securing members. The wave shape is established purely mechanically by a reciprocating movement before the placing in the jacket, which furthermore in practice involves serious difficulties of adaptation. Further, it is known to adhere fibers in undulated paths between two plastic bands which then are wound round a massive support wire, cf. U.S. Pat. No. 3,937,559 (DT-OS No. 24 24 041). Moreover, cables are known where the fibers are helically wound around a soft support layer placed around a central reinforcing member cf. U.S. Pat. No. 3,883,218 (DT-OS 23 55 854). It is a common aim of these known cable types to prevent as far as possible the mechanical impacts on cables at tension or bending from affecting the optical fibers, and especially to prevent the occurence of detrimental tensile impacts.

DT-OS No. 23 02 662 describes a tele-cable containing several optical fibers where several loosely wound separate fibers provided with a protective layer are gathered in basal bundles being provided with a common protective coating. Several basal bundles are gathered to a cable, and the spaces between the basal bundles as well as between the individual fibers are filled with a sliding medium.

This structure with loosely wound fibers entails during maneuvering and handling of the cables a considerable risk of cumulative displacements of the fibers with a consequent risk of vigorous local forces which can reduce or destroy completely the transmission properties of the fibers.

DT-OS No. 24 30 751 describes a tele-cable having a structure of several layers of glass fibers surrounded by a protective sheath of elastomer being wound helically in layers where the protective sheaths are interconnected, and where the pitch is selected in consideration of the choice of material so that the cable has a controlled extension over a wide temperature range. This connection between the protective sheaths means in practice that the cable behaves as if the fibers were cast-in.

This cable is extremely difficult to construct because in practice it has to be built-up over a cylindrical body, requires special tools and makes very specific demands in respect of material properties and angle of pitch.

The U.S. Pat. No. 3,328,143 describes the preparation of multi-fiber structures where the separate fibers are twisted to ensure an intimate contact between these during fusion. Such twisting does not, however, affect the finished fiber bundle.

From DT-OS No. 25 12 006 and also from a number of the above publications it is known to place in a cable an optical fiber with forced helical shape and provided with a sheath. However, all these publications have one thing in common, viz, that there is no preshaping of the element, and DT-OS No. 25 12 006 comprises in particular the feature of a controlled twisting which keeps the fiber in shape and which in a usual manner within the cable technology utilizes steam barrier layer, buffer layer, etc. Thus, the fibers have no free location in a tubular jacket, of the contrary, they are arranged systematically around a central tension relief element.

Finally, from DT-OS No. 25 13 723 flat cables are known in which an optical fiber is placed parallel and in direct connection with a strength member of massive spring steel in a common flat protective sheath. The strength member is rigidly connected with the sheath while the fiber essentially free of tension and without being given a preshaping is located in a space being parallel with the tension relief element in the sheath, but without being rigidly connected with the sheath and without being provided with a tight-fitting coating. Said flat cable is made to be attached directly to the wall or can be shaped especially flexible by making it helically shaped by winding it around a drift so that it is shaped as a helical spring due to the tension element being of spring steel.

There is nothing in the publication, indicating that the flat cable thus formed can, not to say, shall be placed in a tubular jacket. The object of the present invention is to provide constructional characteristics whereby it is possible to a greater extent than before to avoid deterioration or destruction of the optical fibers in respect of their transmission capability as a consequence of mechanical impacts such as tension, bending, torsion and vibration. In this connection it must be remembered that deterioration or even destruction of the transmission capability for an otherwise perfect optical fiber can be expected if due to one or several defects its light conductive interior is narrowed or bent even at an extremely small part of a cable section where the magnitude of the extent of the defect only amounts to a fraction of a millimeter, for which reason such defects are referred to as microcracks or microbendings. It is obvious that the tensile force affecting the optical fiber will increase the possibility of microcracks the bigger the tensile force is. In the heretofore known constructions of tele-cables with optical fibers efforts have been made, as is previously stated, to reduce the magnitude and the risk of tensile stresses in the optical fibers, for example by the said forms of twisted or helical placing of the fibers in the jacket.

DESCRIPTION OF THE ACCOMPANYING DRAWINGS

Figure 9:
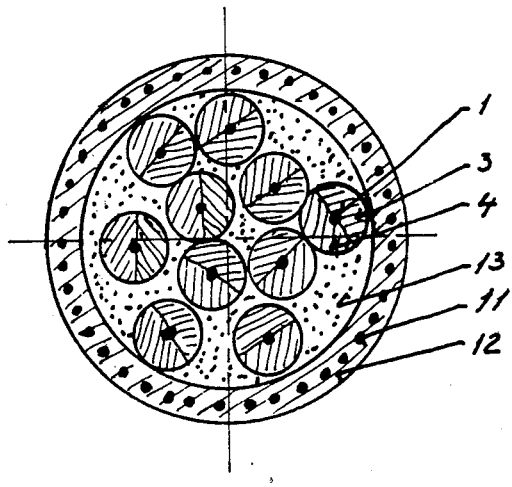

FIGS. 1 and 2 show a part of an element prepared by the process of the invention, and which has been made curved by laying the optical fiber eccentrically in the coating, FIGS. 3 and 4 show a part of an element prepared by the process of the invention, the curvature of which has been caused by applying to the optical fiber two coatings having different contraction tendencies, and which are applied parallel with the fiber axis, FIGS. 5, 6 and 7 show a part of an element which has been given a helical shape by coating two plastic materials in helical shape on the optical fiber, FIG. 8 shows an example of an arrangement for preparing a helical element of the type shown in FIG. 5, and FIG. 9 shows a cross-section of a finished tele-cable with optical elements of the type shown in FIG. 3.

DESCRIPTION OF THE INVENTION

The present process departs from the conventional method as the process is characterized in that by establishing elastic stresses in the fiber and/or the coating, varying over the cross-sectional area of the element, the optical element is given such a permanent preshape that when placed in the tubular jacket it has a marked tendency to assume by itself the desired plane or spatial curve shape.

This curve shape may for example be a plane sine-shaped curve, a more or less oblong helical curve having a constant or varying pitch or a so-called SZ-helical curve, that is a curve where the windings are wound in alternating directions.

When one or more elements produced in this way are placed in a tubular jacket for example for the formation of a cable where they are inserted in a sheath, of course without exposing them to tensile forces during this process, they will by themselves assume the predetermined curve shape.

The radius of curvature of the fiber at the various curve shapes must be selected so that the optical bending losses are kept at a low level. The value of the permissible minimum radius of curvature is—depending on the fiber type—usually between 1-10 cm.

It should be emphasized that by "tubular jacket" is of course not only understood jackets having a circular cross-section as jackets or sheaths of any type can be used which are appropriate in connection with the transmission means of the subject type. Specifically, the jacket may be divided into separate compartments in which one or more of the optical elements prepared according to the invention may be placed.

The characteristic shape of the element according to the invention can be achieved in several ways:

Firstly, the preshaping of the element can be established by giving the optical fiber itself a preshape during or in connection with the preparation of the fiber while it is still hot and workable, or in connection with a later heating of the fiber prepared.

Alternatively, the preshaping of the element can be established by providing the optical fiber with a coating having essentially a circular cross section which is applied eccentrically in relation to the axis of the fiber so that the distance between the axis of the fiber and the axis of the resin layer exceeds one tenth of the radius of the resin layer. By selecting a coating material with a suitable contraction tendency it will be possible to impart the desired shape to the fiber.

Firstly, as coating material the protective layer of a polymer material which is normally applied to the optical fibers may be used. However, this layer is usually very thin, and the application process must therefore be modified so that the layer gets the desired thickness and eccentricity.

Alternatively, the optical fiber which may or may not be coated with such a normal thin protective layer, can be provided with a coating applied closely around the fiber.

Instead of utilizing the contraction tendency at eccentric application, the preshaping of the element can according to the invention further be established by providing the fiber possibly coated with a protective layer with a coating applied closely around the fiber, said coating consisting of two or more types of material with different contraction tendency which each fills its own segment of the essentially circular cross-section of the coating. In that case the coating will usually be applied coaxially with the fiber axis, and the materials can either be applied parallel with the fiber axis, or they can be applied in an oblong helix which may have constant or varying pitch with constant or varying helical direction.

As explained in more details in our copending application Ser. No. 848,695 filed Nov. 4, 1977 and of common assignment herewith optical elements can be obtained with a considerably improved mechanical resistance, if an optical fiber possibly coated with a protective layer is provided with a coating essentially co-axially applied which has been given such an adhesion to the fiber that a contraction tendency in the coating, brought about in connection with—in practice during and/or after—the application of the coating affects the fiber with such an axial compressive force in its whole length that the force will cause a real shortening of the fiber and a corresponding increase of the elongation at break.

This shortening amounts preferably to at least 0.5 % of the original length of the fiber when otherwise the element is not affected by external forces. The compressive stress established in this way in the optical fiber should as far as possible be of a not insignificant order, for example numerically at least one tenth of the tensile stress of the fiber at break.

This adhesion which can be established by the coating material itself and/or an adhesive intermediate layer, can also be utilized in the process of the invention, as elements which both have been given a marked tendency to assume the desired curve shape by themselves, and which show an increased elongation at break, will have particularly good mechanical properties.

Whether or not a compressive force is wanted the coating used to provide the elastic tensions characteristic to the invention and illustrated in the abovementioned embodiments can for example consist of one or more natural or synthetic polymer materials such as polyethylene, polypropylene or copolymers thereof, polyvinyl chloride or polyamide such as polyamide 11 or 12 where latter group of material would seem particularly suitable due to its strong adhesion to other materials. However, this enumeration should not be construed as limiting since the invention is not primarily based on the choice of specific materials, and other polymers and copolymers may also be used.

If desired, the coating can further contain an additive for example a reinforcement material such as longitudinal fibers. Other additives are for example arbitrarily orientated fibers, organic or inorganic fillers, cross-linkers, pigments or dyes.

It will be seen that a finished transmission means, for example a tele-cable containing such elements withstands tensile impacts to an exceptionally high degree. These tensile impacts on the cable may arise during handling or laying out and causes the cable to be elongated. At an increasing elongation the following will happen:

(a) first, the bendings in the elements are straightened,
(b) then the elements are elongated until the compressive force in the optical fibers essentially is zero,
(c) then the optical fibers are elongated and
(d) only then, breaks occur in the optical fibers.

It goes without saying that the elongation of the element and the optical fibers themselves (point b) and c)), occurs simultaneously if the fiber is not exposed to compressive forces.

It will be understood that with a suitable choice of materials the element will get a considerably bigger elongation at break than the elongation at break of the optical fiber.

As an important feature achieved by the invention it can be stated that the elements in the cable even after several tensile impacts will return to the original shape so that the conditions under (a), (b) and (c) are run through in reverse sequence without tendency to cumulative and detrimental displacements.

In one more respect in improvement is achieved over and above the known elements where the optical fibers are supported or fixed, as in the subject elements there is a diminished risk of the formation of microbendings which usually occur where the fiber is exposed to heavily localized forces. Where compressive forces are applied to the fiber, the microcracks are further suppressed as well as the tendency to the formation of such.

The invention is illustrated in greater detail on the drawings where FIGS. 1 and 2 show the optical fiber (1) being eccentrically placed in a coating (5) for example of a plastic material having a suitable adhesion to the fiber. The elastic tension brought about by the contraction of the coating material results in a curved shape of the element. By suitable selection of the eccentricity and of the dimensions of the materials it is possible to obtain a radius of curvature within a very wide range. For the sake of clarity, the cross section is shown as a circle, but the invention is not restricted to this. It is also possible to establish at the same time a desired compressive stress in the fiber by selecting a coating material having a suitable contraction tendency and imparting to it the necessary adhesion to the fiber. By a winding process with or without detorsion it is possible to introduce such elements in helical shape into a cable sheath.

An analoguous effect can be achieved by the embodiment shown in FIGS. 3 and 4 where the element consists of an optical fiber surrounded by a multi-component coating. Here the optical fiber (1) is surrounded by two different polymer materials (3) and (4). If the two materials, due to different contraction tendencies, undergo different shortenings the established elastic tensions will cause the element to assume a curved shape. Also here, it is possible to obtain a desired curving of the element and a desired compressive stress in the fiber by suitable selection of materials, dimensions, extrusion conditions and finishing treatments.

In the embodiment of the invention shown in FIGS. 5 and 6 the multi-component coating is extruded in an oblong helix around the fiber. The helix can have constant or varying and/or screw direction. The tensions brought about by the elastic contractions of the materials will then cause the element to assume essentially a helical shape as shown in FIG. 7. The coating can for example be applied in an extruder with several worms through which the fiber is carried rotating around its longitudinal axis.

FIG. 8 shows an example of an arrangement for preparing a helical element of the type shown in FIG. 7: The coil (14) comprising the optical fiber (1) is placed in the rotating cage (15). From here the fiber (1) is carried to the extruder (16) having 2 worms for each plastic component corresponding to the coating (3) and (4). The optical fiber with the two coatings is carried forward by drawing means (17) placed in the cage (18). In this cage the plastic-coated optical fiber is wound onto the coil (19). The helical shape of the coating is brought about by the synchronous rotation of the two cages (15) and (18) in the same direction. The number of revolutions of the cages together with the drawing velocity at the means (17) determine the helical pitch on the element.

Finally, FIG. 9 shows a cross-sectional view of a finished cable. Optical elements of the type shown in FIG. 3 with the fiber (1) and the two coatings (3) and (4) are placed in a space (13) under a plastic sheath (12) with embedded strength wires (11). The space (13) is filled with vaseline or another filler.

What we claim is:

1. A process for preparing an optical element to be placed in a tubular jacket to form an optical transmission-means, said element comprising an optical fiber provided with a tight-fitting coating, which process comprises imparting to the fiber solely by means of said coating such a permanent preshape that when placed in the tubular jacket the element has a marked tendency to assume by itself a curve shape with a radius of curvature sufficiently big to avoid a substantial increase of the loss at light transmission, said permanent preshape being brought about by the establishment of elastic tensions in the coating which vary over the cross-sectional area of the element.

2. A process according to claim 1, wherein said coating comprises at least one polymer material.

3. A process according to claim 1, wherein the preshaping of the fiber is established by providing the coating with essentially a circular cross-section applied closely around the fiber and eccentrically in relation to the fiber axis so that the distance between the fiber axis and the axis of the coating exceeds one tenth of the radius of the coating.

4. A process according to claim 3, wherein the coating consists of a protective layer.

5. A process according to claim 3, wherein the fiber is additionally coated with an intermediate relatively thin protective layer.

6. A process according to claim 1, wherein the preshaping of the fiber is established by providing the coating with two or more types of material having different contraction tendencies, each type occupying its own segment of an essentially circular cross-section of the coating.

7. A process according to claim 6, wherein the fiber is additionally coated with an intermediate relatively thin protective layer.

8. A process according to claim 6, wherein the materials are applied parallel with the fiber axis.

9. A process according to claim 6, wherein the materials are applied in an oblong helix.

10. An optical element to be placed in a tubular jacket to form an optical transmission means, said element comprising an optical fiber provided with a tight-fitting coating which alone imparts to the fiber such a permanent preshape that when placed in the tubular jacket the element has a marked tendency to assume by itself a curve shape with a radius of curvature sufficiently big to avoid a substantial increase of the loss at light transmission, said permanent preshape being brought about by elastic tensions established in the coating which vary over the cross-sectional area of the element.

11. An optical element according to claim 10, wherein said coating comprises at least one polymer material.

12. An optical element according to claim 10, wherein the coating consists of a protective layer.

13. An optical element according to claim 10, wherein the fiber is additionally coated with an intermediate protective layer.

14. An optical transmission means comprising an optical element placed in a tubular jacket, said element comprising an optical fiber provided with a tight-fitting coating, and to which element is imparted such a permanent preshape that when placed in the tubular jacket the element has a marked tendency to assume by itself a curve shape with a radius of curvature sufficiently big to avoid a substantial increase of the loss at light transmission, said permanent preshape being brought about by establishing in the coating elastic tensions which vary over the cross-sectional area of the element.

15. An optical transmission means according to claim 14, wherein said coating comprises at least one polymer material.

16. An optical transmission means according to claim 14, wherein the coating consists of a protective layer.

17. An optical transmission means according to claim 14, wherein the fiber is coated with an intermediate protective layer.

* * * * *